US012625985B2

(12) United States Patent
Kalmbach et al.

(10) Patent No.: US 12,625,985 B2
(45) Date of Patent: May 12, 2026

(54) METHOD FOR DOCUMENTING INFORMATION

(71) Applicant: Tapio GmbH, Nagold (DE)

(72) Inventors: Jochen Kalmbach, Neubulach (DE);
Christian Neumann, Cologne (DE);
Helmut Schwendele, Empfingen (DE);
Marijo Vinski, Glatten (DE); Matthias Volm, Balingen (DE)

(73) Assignee: Tapio GmbH, Nagold (DE)

( * ) Notice: Subject to any disclaimer, the term of this patent is extended or adjusted under 35 U.S.C. 154(b) by 400 days.

(21) Appl. No.: 17/607,014

(22) PCT Filed: Apr. 27, 2020

(86) PCT No.: PCT/EP2020/061631
§ 371 (c)(1),
(2) Date: Oct. 27, 2021

(87) PCT Pub. No.: WO2020/221698
PCT Pub. Date: Nov. 5, 2020

(65) Prior Publication Data
US 2022/0207167 A1 Jun. 30, 2022

(30) Foreign Application Priority Data

Apr. 29, 2019 (DE) ..................... 10 2019 110 972.8

(51) Int. Cl.
| | |
|---|---|
| *G06F 21/62* | (2013.01) |
| *G06F 21/60* | (2013.01) |
| *G06Q 10/20* | (2023.01) |

(52) U.S. Cl.
CPC ........ G06F 21/6209 (2013.01); G06F 21/604 (2013.01); G06Q 10/20 (2013.01);
(Continued)

(58) Field of Classification Search
CPC ............... G06F 21/6209; G06F 21/604; G06F 2221/2113; G06F 2221/2137;
(Continued)

(56) References Cited

U.S. PATENT DOCUMENTS

| | | | | | |
|---|---|---|---|---|---|
| 5,822,291 | A | * | 10/1998 | Brindze | ........... G11B 20/00137 369/14 |
| 6,463,352 | B1 | * | 10/2002 | Tadokoro | ........... G05B 19/4187 702/33 |

(Continued)

FOREIGN PATENT DOCUMENTS

| | | | |
|---|---|---|---|
| CN | 105159232 A | * | 12/2015 |
| DE | 10236384 | | 1/2004 |

(Continued)

OTHER PUBLICATIONS

Brunsmann et al, "State-of-the-art of long-term preservation in product lifecycle management" DOI 10.1007/s00799-012-0081-4 Published online: Jan. 27, 2012 Springer-Verlag 2012 (Year: 2012).*

(Continued)

*Primary Examiner* — Harunur Rashid
(74) *Attorney, Agent, or Firm* — Morgan, Lewis & Bockius LLP

(57) ABSTRACT

The invention relates to a method and a system for documenting information about an object, such as a machining tool, for example. The method comprises: creating a data record for an object, said data record having at least one data category, wherein the at least one data category enables the creation of multiple data levels; creating an additional data level during the course of transferring the object and the data record to a user, each of which can be protected by an electronic key; and using the object and storing information acquired when using the object in the additional data level.

12 Claims, 1 Drawing Sheet

| LEGEND | |
|---|---|
| 10 | tool manufacturer |
| 11 | manufacturer's key |
| 20 | data record |
| 21 | identification number |
| 22 | additional data level |
| 30 | customer |
| 31 | customer-specific key |
| 40 | maintenance company |
| S1-S5 | method steps |
| X1 | master data |
| X2, X2' | instance data |
| X3, X3' | process data |

(52) U.S. Cl.
CPC ................ *G06F 2221/2113* (2013.01); *G06F 2221/2137* (2013.01); *G06F 2221/2141* (2013.01)

(58) Field of Classification Search
CPC ........ G06F 2221/2141; G06F 21/6218; G06Q 10/20; G06Q 10/087
See application file for complete search history.

(56) References Cited

U.S. PATENT DOCUMENTS

| | | | | |
|---|---|---|---|---|
| 11,204,600 | B2 * | 12/2021 | Kettemer | ........... G05B 19/4185 |
| 2002/0164025 | A1 * | 11/2002 | Raiz | .................... G06F 21/1015 |
| | | | | 380/231 |
| 2012/0303674 | A1 * | 11/2012 | Boensch | .............. G06F 16/252 |
| | | | | 707/802 |
| 2016/0078208 | A1 * | 3/2016 | Namiki | .............. G06F 21/6218 |
| | | | | 726/1 |
| 2017/0171217 | A1 * | 6/2017 | Osterwise | .............. G06F 21/10 |
| 2020/0218235 | A1 * | 7/2020 | Kiefer | .................... G01S 5/021 |
| 2020/0333757 | A1 * | 10/2020 | Belhachemi | ....... G05B 19/0428 |

FOREIGN PATENT DOCUMENTS

| | | | | |
|---|---|---|---|---|
| DE | 102012101478 | | 8/2013 | |
| DE | 102015015808 | | 6/2017 | |
| DE | 102017202360 | | 8/2018 | |
| DE | 102017120381 | | 3/2019 | |
| WO | WO 2017/099972 | | 6/2017 | |
| WO | WO-2017099972 | A1 * | 6/2017 | .......... G06F 21/602 |

OTHER PUBLICATIONS

Liukkonen et al., "Toward decentralized intelligence in manufacturing: recent trends in automatic identification of things" Int J Adv Manuf Technol (2016) 87:2509-2531, DOI 10.1007/s00170-016-8628-y, pp. 2509-2531 (Year: 2016).*

Tao et al., "Data-driven smart manufacturing" Journal of Manufacturing Systems 48 (2018) pp. 157-169 (Year: 2018).*

Ansari et al., "Extending Temporal and Event Based Data Modeling for RFID Databases" Conference: First International Conference on Parallel, Distributed Computing Technologies and Applications (PDCTA 2011)At: Tirunelveli, India vol. 203. pp. 428-438 (Year: 2011).*

Brunsmann et al., "State-of-the-art of long-term preservation in product lifecycle management" Springer-Verlag 2012, Published online: Jan. 27, 2012, pp. 27-39 (Year: 2012).*

Zhang el al., Manufacturing Process Planning, pp. 1-31. (Year: 1994).*

* cited by examiner

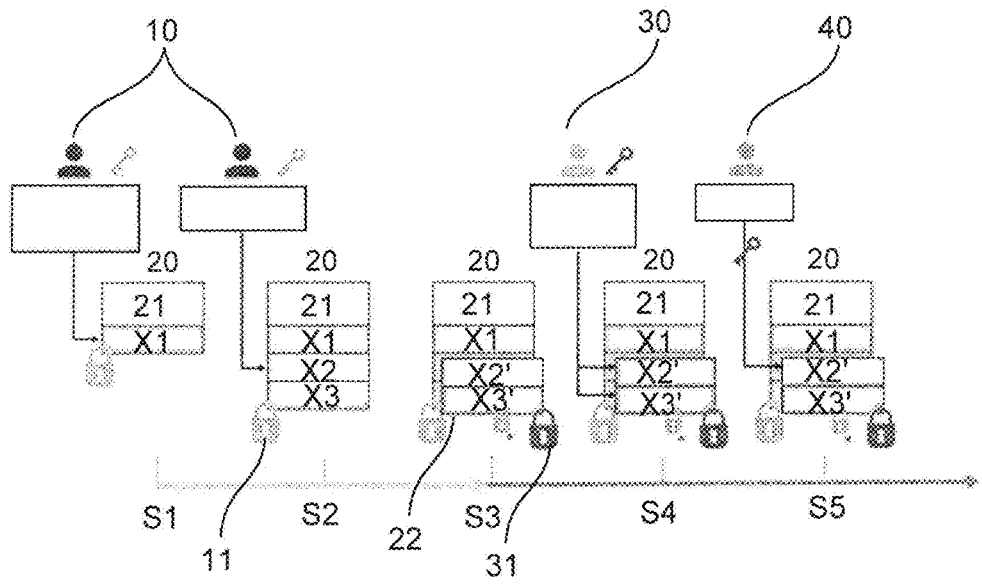
LEGEND
10     tool manufacturer
11     manufacturer's key
20     data record
21     identification number
22     additional data level
30     customer
31     customer-specific key
40     maintenance company
S1-S5  method steps
X1     master data
X2, X2' instance data
X3, X3' process data

METHOD FOR DOCUMENTING INFORMATION

TECHNICAL FIELD

The invention relates to a method and a system for documenting information about an object such as a machining tool, for example. Purely as an example, such an object may be a milling cutter. The method and the system are used in particular in the wood processing industry.

STATE OF THE ART

It is known to store information on a cloud server and to protect this information by means of a password. Access to the information can thus be enabled within the scope of a read permission or a read and write permission.

However, such a method cannot, or cannot fully, meet the increasing demands with regard to cooperation among the several actors involved. Security aspects in particular require new approaches that cannot be realised with the known systems or methods.

SUBJECT MATTER OF THE INVENTION

An object of the invention is to provide a method and a corresponding system to increase the security of information about an object.

Claim 1 provides a corresponding method. Other preferred embodiments are presented in the dependent claims. The invention further relates to a system that is preferably adapted to carry out individual or also all steps of the method.

The method comprises the following steps: creating a data record for an object with multiple data categories, wherein at least one of the data categories enables the creation of multiple data levels; creating an additional data level during the course of transferring the object and the data record to a user, each of which can be protected by an electronic key; and using the object and storing information acquired when using the object in the additional data level. The steps of preparation, creation and use are preferably carried out in the order stated.

The method has the advantage that a high level of data security can be guaranteed through electronic data processing. Furthermore, data levels with respective protection ensure that only those who also have the corresponding security key have access to a certain data level. Thus, when the data record is transferred, it can be ensured that the transferring entity retains rights of access to the specific data level or can transfer them selectively by transferring the electronic key.

The data record makes it possible, for example, to store information about the wear or alteration of the object, which may in particular be a machining tool.

The particular advantage to the user is that data is used without potential transfer errors in the machine. Based on the electronically transferred error-free data, the machine can determine whether the object, in particular the machining tool, is within, or is operated within, the permissible range. Furthermore, it is possible to expand the data pool with the user's own data, which accumulates during operation and can be used for management purposes. Throughout the product life cycle, data can be shared with other actors, in particular manufacturers, service providers, consumers, etc. Specific examples are end-consumers, machine, tool, software and material manufacturers, and furniture makers. Actors can act as data providers and/or data consumers.

This simplifies, secures and improves service delivery by service providers and/or manufacturers. It allows analyses of performance, quality and service life. Furthermore, the user can use the data record to further improve processes based on the information in the data record. The knowledge of multiple actors can be pooled for this purpose. Moreover, complete documentation is possible.

Throughout the entire product life cycle, the manufacturer of the object (for example, the machining tool) can provide information about its product to the customer. If the customer is willing to share data with the manufacturer, this information obtained from operational use of the goods can provide the manufacturer with valuable information and insights relating to its products in use. This allows the object to be further adapted and improved.

The said object may be what is called active object which itself acquires or generates information and, where applicable, stores said information. Such an object could be, for example, a processing unit or a processing machine.

According to another embodiment, the object is passive. In this case, the acquisition and storage of the information are carried out by a unit or device or manually by electronic means or similar. A machining tool is mentioned as a concrete example. Information about the machining tool is acquired from the machine using this tool. Another embodiment of a passive object is a coating material. A machine using this coating material records the consumption of the coating material.

The object is preferably selected from the group comprising: a machining tool; a coating material; a consumable; a machine, in particular a machine for machining wooden workpieces. A machining tool can be, for example, a milling tool, a drill, a scraper or similar. The machine for processing a workpiece, such as a wooden workpiece, can be an active component or it may include an active component.

The said coating material can be, for example, a plastic coating material or a veneer, the coating material being preferably in strip form. The consumable may be, for example, an adhesive, a primer, print material or the like.

It is further preferred that the use of the object relates to use of the object in a processing machine. For example, the object may be a coating material that is applied to a workpiece by means of the processing machine. Such a coating material may be in the form of rolls, for example. As the coating material is used, the amount of coating material available decreases.

For example, a processing machine can read and interpret digital information about the adhesive used. It then processes the adhesive with optimal processing parameters. The adhesive manufacturer (data provider) can define which information about the adhesive may be used by whom (data consumer).

According to a further embodiment, the use of the object relates to maintenance of the object. For example, it may concern maintenance of a machining tool. The object and the data record are preferably transferred to a maintenance company for maintenance. Thus, the maintenance company can access the data record and add information to the data record. New information is in turn created when the adhesive is processed. The adhesive and the machine are owned by an operator. Thus, the new information is also owned by the operator (data provider). The operator can now define who (data consumer) may use this data and how.

On this basis, the actors involved can define how to handle the data created by them. A company can assume the role of data consumer and/or provider depending on the ownership of the business assets.

The data record can be stored in a cloud so that it can be accessed from any location and/or without special software. This method also allows high availability.

A control device of a processing machine can access the data record when the object is used, so that the processing machine can be adjusted and the production process optimally coordinated.

According to another embodiment, it is possible that, before the object is used, the data record is accessed via a computer, tablet or smartphone and the information contained in the data record is entered into the control device of the processing machine via an input device. It is also possible to use the input device to read a code, for example a QR code, that contains information from or refers to the data record.

According to one embodiment, it is provided that the data categories comprise master data, instance data and process data, the master data being static data created by the manufacturer, in particular data on the model series of the object, the instance data being data of a single, individual object, such as geometric data of the object or the individual serial number, and process data being information relating to use of the object in a processing machine.

The key may include read and/or write permissions for the additional data level or parts of the data level of the data record. This makes it possible to grant specific access rights to fields of the data record that allow parts of the data record to be changed or added to.

The key can have further attributes, for example an attribute for time-limited access, for a certain number of accesses or for a certain data volume.

A key of a particular user may differ from a key of another user.

When the data record is transferred to another user or maintenance company, the key can be transferred so that the other user or maintenance company can add any additional information to the data record.

User access is preferably documented as part of the process. This allows an individual access, in particular the person gaining access, the time of access and/or the retrieved or changed information, to be stored as part of a bookkeeping process.

Data acquisition may further include calculation or derivation of the information prior to storage. This makes it possible to compress the information and/or prepare it for further processing.

Furthermore, it may be provided that items of information from different sources are linked to one another in one or more data levels. Different items of information can be merged in this way.

A further embodiment provides for the creation of a data record with multiple dimensions (in matrix form), in particular where items of information from different sources are linked to one another.

The invention further relates to a system for documenting information about an object, in particular a machining tool, a coating material or a consumable, for example according to one of the aforementioned embodiments. The system or a device thereof may be adapted to carry out a method according to any of the aforementioned aspects.

The system comprises: a storage device for storing a data record for an object, such as a machining tool, the data record having multiple data categories and at least one of the data categories enabling multiple data levels to be created, the data record being supplemented by an additional data level protectable by an electronic key when the object is transferred to a user, and a processing machine which is adapted to use the object, the processing machine comprising one or more sensors which are adapted to acquire information relating to the use of the object and to store it in the additional data level of the data record.

Data acquisition may further include calculation or derivation of the information prior to storage. This makes it possible to compress the information and/or prepare it for further processing.

Such a system has, among other things, the advantage that a high level of data security can be guaranteed by electronic data processing and that the aforementioned data levels with respective protection guarantee a high level of security, in particular that only those who also have the corresponding security key have access to a certain data level. Thus, when the data record is transferred, it can be ensured that the transferring entity retains rights of access to the particular data level or can transfer them selectively by transferring the electronic key. The data record makes it possible, for example, to store information about the wear or alteration of the object, which may in particular be a machining tool.

In particular, it is provided that the storage device is a globally available storage device, in particular a cloud.

BRIEF DESCRIPTION OF DRAWING

FIG. 1 shows a schematic view illustrating a method according to the invention.

DESCRIPTION OF THE PREFERRED EMBODIMENT

A preferred embodiment of the invention is described below. Although the embodiment is merely exemplary and not restrictive, features of the embodiment can also be used to specify the invention. Furthermore, modifications may be combined with one another to form further embodiments of the invention.

The embodiment relates to a method and a system for documenting information about an object such as a machining tool, for example. The embodiment will be explained using a specific example of a milling cutter, although other machining tools are also conceivable in this context. Further examples of objects are a coating material, in particular a coating material in strip form for coating a narrow side of a workpiece in sheet form, an adhesive, a material for printing a workpiece or similar.

The milling cutter is first produced by a tool manufacturer 10, so that the milling cutter exists as a physical object. Immediately after the milling cutter is produced, this tool is not yet uniquely identifiable. Rather, the milling cutter belongs to a certain model series and a certain batch (master data). The characteristics of the said model series and batch are known to the tool manufacturer.

After the physical tool (here: milling cutter) is produced, a data record 20 is created which comprises master data X1, instance data X2 and process data X3 as data categories. The data record can be created manually or, for example, automatically as part of a successfully completed quality control process.

The master data (X1) is static data generated by the manufacturer, in particular data concerning the model series or serial number of the machining tool. A serial number may be regarded as master data in particular if the serial number applies to several machining tools of the same type.

The instance data (X2) is geometric data of the machining tool. In the course of commissioning at the manufacturer, process data (X3) is also generated containing information about the use of the machining tool object in a processing machine, such as the cutting path, the material processed and the machine used. A serial number can also be assigned to the instance data if the serial number is individually assigned to a specific machining tool.

The data record 20 is first assigned a specific identification number 21, so that the data record 20 is assigned to the milling cutter. The master data X1 known to the tool manufacturer is also entered in the data record 20. The master data includes, for example, information about the model series of the machining tool (milling cutter). This step is summarised as step S1 in FIG. 1.

After the milling cutter has been produced, certain adjustments can be made to the machining tool by the manufacturer or later in the life cycle of the machining tool. An example of such an adjustment is a grinding operation on the milling cutter, leading to the finishing of the machining tool. Such a grinding operation may be carried out by the manufacturer after the milling cutter has been produced. As a result of the grinding process, the milling cutter assumes an individual diameter. This characteristic value is documented in the data record 20 as part of the instance data X2. The data category of process data X3 is created in the data record 20, but is not usually populated with further information by the manufacturer. However, a test run could be carried out with a specific milling cutter, for example, so that it is possible to document the information resulting from the test in the data category of process data X3. The creation and/or documentation of instance data X2 and process data X3 is performed in step S2 according to the procedure shown in FIG. 1.

The information stored by the manufacturer of the milling cutter in the data record 20 is protected with a manufacturer's key 11. The key 11 may include read and/or write permissions for the said data categories.

The milling cutter remains in the possession of the tool manufacturer until the machining tool is delivered/commissioned. This also applies to the data record 20. Delivery of the milling cutter and thus also transfer of the data record 20 is carried out in step S3.

The customer 30 may insert another data level 22 in the data record 20 comprising both instance data X2' and process data X3'. Such a data level 22 can also be inserted by the system if, for example, certain specified conditions require it. The key 11 may include read and/or write permissions for the additional data level 22.

In this context, the customer can retrieve data for operating the milling cutter in the processing machine from the data record, read it for example through suitable access or make it readable by transferring it to a computer, tablet or smartphone or through a printout, and thus allow it be entered it manually in a control or storage device so that the milling cutter can be operated correctly in accordance with the machine specifications. The data can be transferred electronically free of errors and processed accordingly in the processing machine.

During operation of the milling cutter in the processing machine, new data is accumulated which can be acquired by the customer, preferably through sensors or through calculation with a control device of the processing machine. The acquired data can be prepared in the processing machine for later use if required. The data record 20 available to the customer now makes it possible to document the data acquired by the customer, depending on the category, in the instance data X2' or process data X3' of the data record 20.

For example, storage locations, processed materials, metres cut or the like can be recorded over the operating time of the milling cutter. For this purpose, the customer has access to the additional data level 22 of the data record 20. The data is protected by a customer-specific key 31. The customer-specific key 31 may include read and/or write permissions for the additional data level 22 of the data record 20.

Maintenance may be required during the life cycle of the milling cutter (step S5). If the milling cutter is re-sharpened or otherwise further treated during the life cycle of the milling cutter, the diameter of the milling cutter will change. Maintenance of the milling cutter may be carried out by a maintenance company 40. To carry out maintenance, both the milling cutter itself and the data record 20 are transferred to the maintenance company 40. Furthermore, the maintenance company 40 can acquire access rights to the data level 22 of the data record 20 via the transferred key 31.

The change can be stored in the data record 20 by the maintenance company 40 (in particular modified instance data X2') when the third-party provider receives the customer's key for the data record of the milling cutter in order to modify the data. The data relating to the milling cutter can be continually updated in this way.

During the life cycle of the milling cutter, the manufacturer 10 can provide the customer 30 with further information, which can also be stored in the data record. The manufacturer can also inform customers about a successor product or alternatives.

If the customer 30 re-sells the milling cutter, an additional data level can be created in the data record, in which the further customer can store specific instance data and process data and protect them with an appropriate key.

The invention claimed is:

1. Computer-implemented method for documenting information about a machining tool, the method comprising the steps of creating a data record for a machining tool, said data record having data categories, wherein the data categories enable the creation of multiple data levels, creating an additional data level during the course of transferring the machining tool and the data record to a user, each of which being protected by an electronic key, and using the machining tool and storing information acquired when using the machining tool in the additional data level, wherein the use of the machining tool relates to a use of the machining tool in a processing machine, wherein the data categories comprise master data, instance data and process data, the master data relating to static data produced by the manufacturer, the instance data relating to geometric data of the machining tool, and the process data relating to information concerning use of the machining tool in a processing machine.

2. Method according to claim 1, wherein the machining tool comprises a milling cutter.

3. Method according to claim 1, wherein use of the machining tool concerns maintenance of the machining tool, the machining tool and the data record being transferred to a maintenance company for maintenance.

4. Method according to claim 1, wherein the data record is stored in a cloud.

5. Method according to claim 1, wherein a control device of a processing machine accesses the data record when the machining tool is used.

6. Method according to claim 1, wherein the key includes read and/or write permissions for the additional data level or parts of the data level of the data record.

7. Method according to claim 1, wherein when the data record is transferred to a further user or maintenance company, the key is transferred.

8. Method according to claim 1, wherein the key has one or more attributes selected from: time-limited access, a certain number of accesses or a certain data volume.

9. Method according to claim 1, wherein an active object acquires information about the active or passive object, or a unit or device is used to acquire information about the machining tool.

10. System for documenting information about a machining tool, comprising:

a computer having a data storage device for storing a data record for a machining tool, the data record comprising multiple data categories and at least one of the data categories enabling the creation of multiple data levels, the data record being supplemented by an additional data level protected by an electronic key upon transfer of the data record to a user, and a processing machine configured to use the machining tool, the processing machine comprising one or more sensors adapted to acquire and store information on the use of the machining tool in the additional data level of the data record, wherein data categories comprise master data, instance data and process data, the master data relating to static data produced by the manufacturer, the instance data relating to geometric data of the machining tool, and the process data relating to information concerning use of the machining tool in a processing machine.

11. System according to claim 10, wherein the storage device is a globally available storage device.

12. System according to claim 10, wherein the machining tool is a woodworking processing machine, or a wood handling machine.

*   *   *   *   *